(No Model.)
E. D. WATROUS.
TRELLIS SUPPORT.
No. 377,444. Patented Feb. 7, 1888.
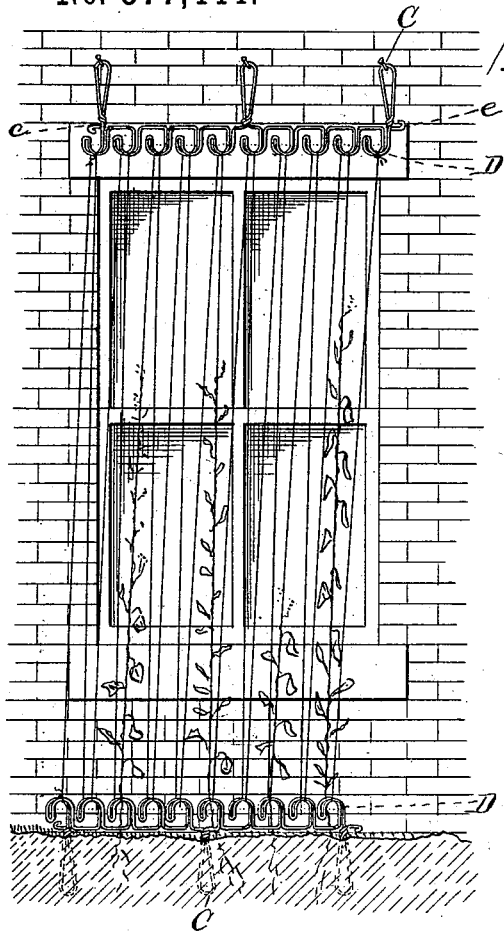
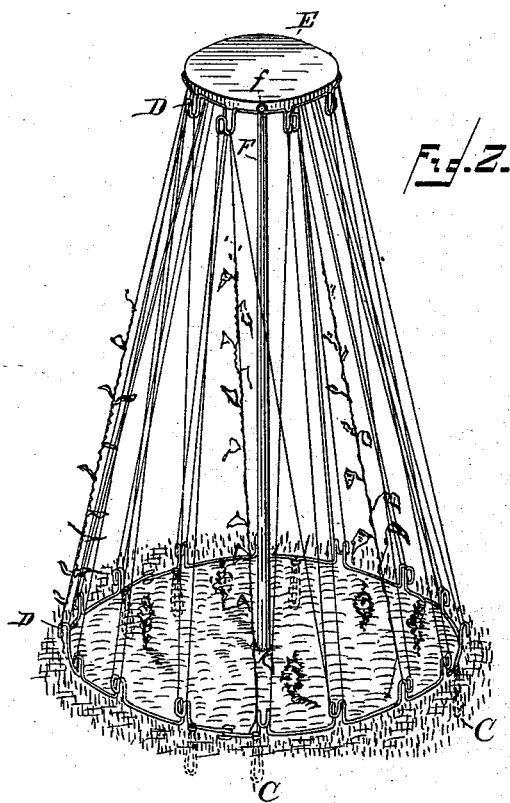
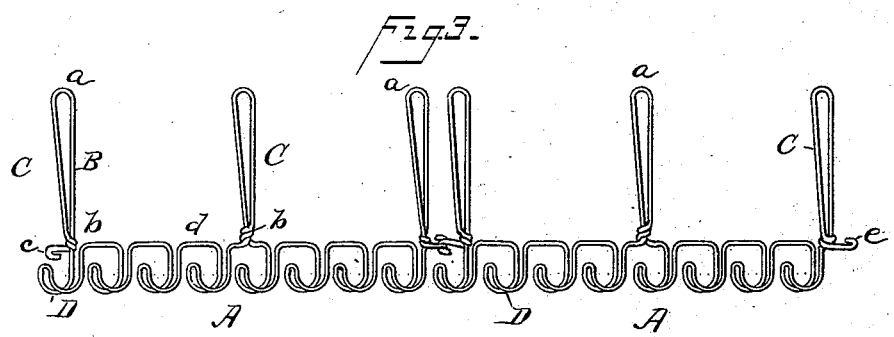

UNITED STATES PATENT OFFICE.

EMMA D. WATROUS, OF FREETOWN, NEW YORK.

TRELLIS-SUPPORT.

SPECIFICATION forming part of Letters Patent No. 377,444, dated February 7, 1888.

Application filed September 21, 1887. Serial No. 250,310. (No model.)

*To all whom it may concern:*

Be it known that I, EMMA D. WATROUS, a citizen of the United States, residing at Freetown, in the county of Cortland and State of New York, have invented certain new and useful Improvements in Trellis-Supports; and I do hereby declare the following to be a full, clear, and exact description of the invention, such as will enable others skilled in the art to which it appertains to make and use the same, reference being had to the accompanying drawings, which form part of this specification.

My invention relates to a trellis-support, and has for its object to provide a series of short hooks and long loop-arms or supports in one section and composed of one piece of wire, the arms being adapted to be inserted in the earth in a flower-bed or in the earth adjacent thereto, the holder also being adapted to be inverted, and in that position the arms attached to the house above the window, or to the upper portion of a porch, or a bar or disk on a pole extending upward from the center of a bed containing twining vines, as morning-glories, for the purpose of looping or lacing cords, strings, soft wire, or other suitable flexible material over the hooks, and extending it from the upper to the lower ones for the vines to run up on; and it consists in the construction hereinafter described, and more particularly pointed out in the claims.

Referring to the drawings, Figure 1 is a plan view of my support in use in a bed of vines by the side of a window, with an inverted section of the same over the window. Fig. 2 shows a view of two or more sections of my flexible support united to form a circle and inserted in the ground around a bed containing twining vines, with a modified form of the support attached to an elevated disk on a pole in the center of the bed. Fig. 3 is an enlarged view of two sections of my support united.

Like letters of reference refer to corresponding parts in each figure of the drawings.

The support is made in sections, (represented by A,) and are of strong wire of any desired length, and of suitable size for the purpose for which it is intended.

It has been found more convenient in use to have the sections of the supports made about one-half yard long and united by hooks, though they may be of any other desired length. In their manufacture a long piece of wire is first bent upon itself at *a* near one end, and the short or end portion brought back upon and twisted at *b* around the long or body portion B, forming a long loop-arm or support, C. After being twisted around the long or body portion B, the end of the wire is turned outward at right angles to the loop-arm and formed into a connecting-hook, *c*, that is turned outward from the loop-arm. As the body of the wire passes beneath the twist *b*, it is extended downward and curved outward and upward, forming a hook, D, that stands at right angles to the hook *c*, and is then bent back upon itself, preserving the same contour until it reaches the plane of hook *c*, forming a double hook. The wire is then bent at right angles to the loop-arm on the opposite side from the hook *c*, and on the same plane therewith, to form a spacing-bar, *d*, between the hooks, when it is again bent in the same manner as in the first instance to form another hook, D′, and so continued until a sufficient number is formed to require another loop-arm or support C.

In forming an intermediate loop-arm or support C between the series of hooks D in a section, the spacing-bar *d* is extended only one-half the distance between the hooks, when it is bent at right angles to the bar and extended outward in the same direction as the first arm and bent upon itself and returned to near the plane of the space-bar, when it is twisted around the extended portion in the same manner as in forming the first loop-arm, and then continued to form the remaining portion of the space-bar, when it is bent downward to form the hook D, as before. When the hooks D and loop-arms C have thus been extended, forming a section A of the desired length, a loop-arm is formed at the end of the section in the same manner as before described, with a connecting-hook, *e*, at right angles therewith, which is turned upward toward the loop-arm, or at right angles to the direction of the connecting-hook *c* on the opposite end of the section. Thus formed, any desired number of these sections may be united by the connecting-hooks *c e*, so as to extend the length of a porch or house, or be reduced in numbers so as to cover only the width of a single window.

Where it is desired to suspend the section A from a disk, E, above the ground on a pole, F, or by other means, as shown in Fig. 2, or from any article not having a surface or thickness equal to the length of the loop-arms or supports C, the long loop-arms may be omitted and small eyes $f$, slightly above the spacing-bars, may be substituted, through which the section can be secured to the disk or other article by nails or screws.

In operation the loop-arms or supports C of the sections are inserted in the ground of the bed containing the trailing vines, or in the ground adjacent thereto, with the lacing-hooks D extending outward from the bed or house just above the ground, while an inverted section, with the loop-arms extending upward to be used as hangers, is hung above the window or upon other supports, with the lacing-hooks extending downward and outward, thus afforning a convenient means above and below the window or other support, upon which the cord or other suitable material is easily laced or hooked over, which may be extended from one side to the other without cutting or tying, except at the ends. The sections having connecting-hooks on their ends, they may be united or linked together to any desired length, and being flexible they can be placed in a circular position around beds containing twining vines that it is desired to trail up over windows, or be made to conform to a bay-window circular in form, or to an elevated disk, or to any other desired form upon which they may be placed.

Having thus fully described my invention, what I claim as new, and desire to secure by Letters Patent of the United States, is—

1. A trellis-support consisting of a flexible section provided with a series of lacing-hooks upon one side, with spacing-bars between the hooks and integral therewith, and loop-arms or supports upon the other side, as and for the purpose set forth.

2. A trellis-support consisting of a section formed from a single piece of flexible material provided with a series of double lacing-hooks upon one side with spacing-bars between the hooks and long loop-arms on the other side, the loop-arms at the ends of the section having connecting-hooks at right angles thereto, as and for the purpose set forth.

3. A trellis-support consisting of a single piece of wire bent to form loop-arms on one side and double lacing-hooks on the other side, and spacing-bars between the hooks, the ends of the wire being twisted around the loop-arms and extended at right angles thereto to form connecting-hooks on a line with the spacing-bars at the end of the section, as and for the purpose set forth.

In testimony whereof I affix my signature in presence of two witnesses.

EMMA D. WATROUS.

Witnesses:
GEORGE A. BENHAM,
A. S. MORTON.